3,023,108
PROCESS FOR PREPARING CRANBERRY SAUCE
Edward E. Anderson, Lexington, and Arthur W. Anti, Kingston, Mass., assignors, by mesne assignments, to Ocean Spray Cranberries, Inc., Hanson, Mass., a corporation of Delaware
No Drawing. Filed Feb. 3, 1960, Ser. No. 6,385
5 Claims. (Cl. 99—103)

This invention relates to a processed food product and more particularly to an improved method for processing cranberries and the resulting product.

A sizable portion of the cranberries grown is marketed as canned, whole cranberry sauce and this product has found good acceptance. In this form it is desirable to prepare for marketing a product which closely resembles whole cranberry sauce as it is normally prepared by the housewife, i.e., a product which achieves good whole berry identity. However, preparing such a product is not just a matter of boiling cranberries and canning them for it is necessary that the canned product have the whole berries suspended in a gel without any appreciable product separation. This in turn has required that the pectin within the cranberries be released to react with the sugar syrup in which the cranberries are cooked in order to form the gel-like material. Thus the desire to maintain the cranberries as whole berries is opposed to the necessity for releasing from the cranberries the required pectin and coloring matter. Cranberry pectin is unique and cannot be duplicated by any other fruit pectin. A low methoxy synthetic pectin could be added to achieve the amount of gelling required, but this would add materially to the cost of the final cranberry sauce. Thus in order to make an acceptable, economically feasible cranberry product, cranberry pectin must be used.

Whole cranberry sauce is now commonly prepared by slashing or slicing all, or at least a portion, of the individual berries, and then cooking the berries in a sugar syrup for about 15 minutes before discharging the cooked mass into the filling machines. This, of course, requires the use of batch operations because of the prolonged cooking necessary. The necessity for slashing or slicing the berries in turn is responsible for producing in the final product large quantities of what may be designated as "skin rollers." These are formed when the skin of the berry is peeled off in the cooking process and rolled up to form what appears to be long sticks or stems. The loss of skin causes the disintegration of a large percentage of the cranberries with corresponding reduction of whole berry identity. An alternative way of cooking the cranberries, designed to shorten their cooking time, is to heat the syrup first and then introduce the cranberries, but this is not successful in eliminating the skin rollers or in achieving a good whole berry identity in the finished product since cooking must still be carried out for a relatively long period of time.

It will be seen from this review of the prior art that there is a need for a method of processing cranberries which materially lessens the processing time and which produces an improved product.

It is therefore an object of this invention to provide an improved method for processing whole cranberries to produce a whole cranberry sauce. It is another object to provide a method of the character described which materially reduces the time required for processing and which at the same time gives a finished product with improved properties with respect to flavor, texture and physical appearance. It is another object of this invention to provide a process which is adaptable to a continuous operation. It is yet another object to provide a product characterized as being a whole cranberry sauce essentially free from skin rollers, having a soluble solids content from about 38 to 42% by weight, good color and improved whole berry identity as compared with the cranberry sauce now marketed. These and other objects will be apparent in the following detailed description.

The process of this invention may be characterized as boiling whole cranberries with from about 1 to 10% their weight of finely comminuted cranberries for from about 30 seconds to 3 minutes. The resulting whole cranberry sauce comprises processed whole cranberries and a sugar solution containing from about 1 to 10% by weight of the whole cranberries in the form of finely comminuted cranberries which furnish sufficient pectin which is immediately available to form a gel with the sugar.

In the process of this invention a sugar syrup may be purchased as such or is made up by dissolving the required amount of sugar in water and bringing it to a boil or close to the boiling point. Normally it is not desirable to boil the sugar syrup for any length of time since this results in loss of water and change in concentration of the sugar. The sugar syrup may be made entirely of sucrose or more preferably of a combination of sucrose and corn syrups. The final sugar syrup into which the berries are introduced may be further characterized as containing from about 55 to 70% by weight of sugar.

The cranberries which are to be introduced whole are processed in the usual manner, i.e., they are sorted, washed and have the stems removed. The process of this invention is equally well suited to the use of fresh or frozen cranberries. Likewise, the berries which are to be comminuted and mixed with the whole cranberries are sorted, washed and cleaned and are finely comminuted by any suitable method such as by grinding or running through a blender or a machine capable of reducing them to a puree.

The quantity of comminuted cranberries to be added should amount to from about 1 to 10% by weight of the whole cranberries added. A preferred range is from about 2 to 5%. With less than about 1% it appears that insufficient pectin is furnished and made immediately available in the cooking for reaction with the sugar; while with more than about 10% the proportion of whole berries falls below that desired in the final product.

The whole and comminuted berries are then introduced into the boiling or near boiling syrup either in separate quantities or after they have been mixed. For 100 parts by weight of berries, from about 60 to 80 parts by weight of sugar (solid basis) are used.

Once the cranberries in the whole and comminuted form are introduced into the hot syrup, the product is heated to boiling as rapidly as possible and boiling is continued from about one half to three minutes, depending upon the final characteristics with respect to the overall quality desired in the final product. The preferred processing time is about one minute. Boiling time greater than three minutes may cause excessive breakdown of the whole cranberries with development of skin rollers, loss of flavor, etc. The resulting whole cranberry sauce is then canned by any suitable means such as by packing them under vacuum by one of several known techniques. Thus the sauce may be transferred to the container at a proper initial closing temperature to assure a suitable vacuum in the can after sealing and cooling. The sauce may also be steam-flow closed in the can or vacuum closed in the can. Another process involves replacing the air in the headspace with an inert gas such as nitrogen prior to sealing.

During the processing, cooling, and storage of the whole cranberry sauce, the soluble solids in the gel surrounding the whole berries gradually penetrates throughout the whole berries since substantially all of them have been cracked open. The total soluble solids content of the sauce amounts to between about 38 and 42% of the weight. Examination of the finished product shows it to have the desired red coloration and the berries which had been introduced in the form of whole berries maintain their whole-berry identity and are evenly suspended in the gel without any undesirable product separation. Moreover, essentially all of the skins of the whole berries, although broken by the short boiling, remain as an integral part of the berries. This in turn means that the whole cranberry sauce of this invention is essentially free of skin rollers which are so objectionable from the standpoint of taste, texture and appearance. From a standpoint of flavor, the whole cranberry sauce of this invention retained more of the fresh cranberry aromatics over that prepared by the usual process. This is believed to be due to the fact that the cooking time has been very much shortened, thus permitting the natural flavor and aroma of the original berries to be retained. At the same time, by maintaining the whole berry identity of the berries in that form, and by preventing separation of berry skins from the remaining portion of the berry, the flavor of the berries remains essentially completely integrated.

The process of this invention may be further illustrated by the following examples.

*Example I*

Frozen Early Black variety of cranberries were thawed in cold water to a constant temperature of 40° F. One thousand grams of these cranberries was weighed out and set aside. An additional 20 grams of the thawed cranberries was comminuted in a Waring Blendor and added to the 1,000 grams of whole berries. 1,120 grams of sugar solution containing 65% sucrose was brought to 180° F. in a separate vessel. The cranberry mixture and the hot sugar syrup were then placed in a steam-jacketed kettle and the mixture was brought to the boiling point as rapidly as possible and boiled for one minute. The resulting sauce was then placed into jars, capped and water cooled to 100° F. After 24 hours of standing the soluble solids content of the gel was 43.1% in the whole cranberry sauce thus prepared. Additional storage time would be required to arrive at final equilibrium, i.e., about 40%. Additional samples of the material were then permitted to stand for seven days and the soluble solids content again determined. In this case the sauce was reduced to a fairly homogeneous puree in a Waring Blendor to simulate the condition which would be experienced after equilibrium had been reached between the berries and the surrounding soluble solids in the gel in which the berries were suspended. Under these conditions the soluble solids content amounted to 39.6% by weight of the cranberry sauce.

*Example II*

Whole cranberry sauce was prepared as in Example I except that 50 grams of comminuted cranberries (amounting to 5% by weight of the solid berries) was added instead of the 20 grams of Example I. At the end of 24 hours, the soluble solids content was 43.8% and at the end of seven days it was 41.1%. Additional equilibrium might be expected over a period of up to 30 days.

*Example III*

Whole cranberry sauce was made as in Example I except that 10% comminuted berries were added in place of the 2% of that example. The soluble solids content amounted to 45.2% at the end of 24 hours and 42.7% at the end of seven days with partial equalization.

The process of this invention has the added advantage that it can be adapted to a continuous operation. In a continuous operation an appropriately metered stream of boiling syrup is brought into contact with an appropriately metered stream of previously prepared mixture of whole and comminuted cranberries. Suitable heating conditions are provided so that the mixture is maintained at about 212° F. for a sufficient length of time to amount to the equivalent of boiling the mixture for at least 30 seconds. The resulting stream of cranberries in sugar syrup is then introduced directly into the cans in which they are to be packed. Thus, the rapid cooking time and the high flow of product output makes the process of this invention capable of continuously producing the whole cranberry sauce.

We claim:

1. Method of preparing a whole cranberry sauce, characterized by boiling whole cranberries from about 30 seconds to 3 minutes in an aqueous sugar solution with from about 1 to 10% their weight of finely comminuted cranberries, the amount of water and sugar in said solution being such as to form a sauce having a soluble solids content from about 38 to 42% by weight.

2. Method of preparing a whole cranberry sauce, comprising the steps of heating a sugar syrup to near boiling, introducing a mixture of whole cranberries and finely comminuted cranberries into said heated syrup and boiling the resulting cranberry syrup product for from about 30 seconds to 3 minutes, said sugar syrup containing a sufficient amount of water and sugar to form a sauce having a soluble solids content from about 38 to 42% by weight.

3. Method in accordance with claim 2 wherein said sugar syrup is a water solution of sucrose present in an amount equivalent to from about 55 to 70% by weight of the sucrose.

4. Method in accordance with claim 2 wherein said sugar syrup is a mixture of sucrose and corn syrup.

5. Method in accordance with claim 2 wherein said mixture of cranberries comprises from about 1 to 10% by weight of said finely comminuted cranberries.

References Cited in the file of this patent

UNITED STATES PATENTS 2,700,614    Critzman et al. _____ Jan. 25, 1955